Sept. 10, 1963     H. REINSCH ETAL     3,103,152
CAMERA SUBASSEMBLY
Filed Oct. 8, 1959
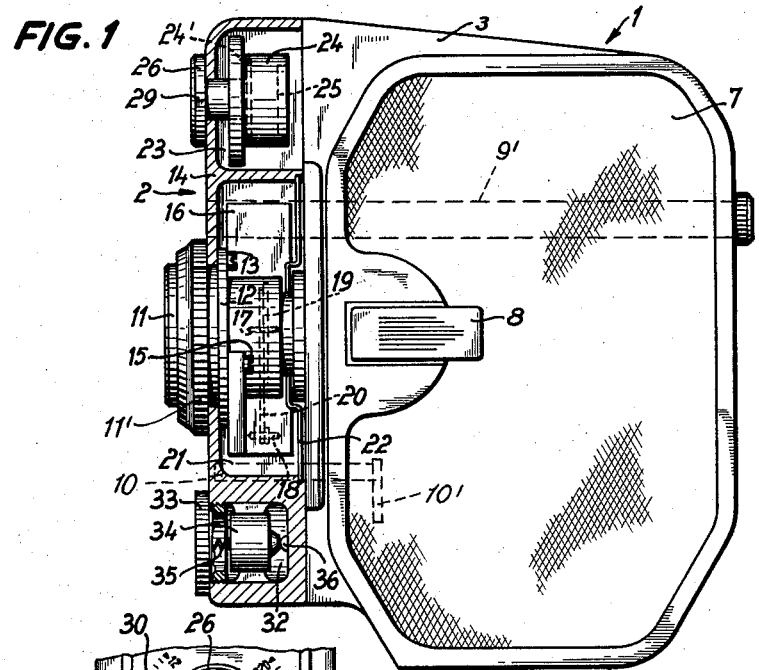
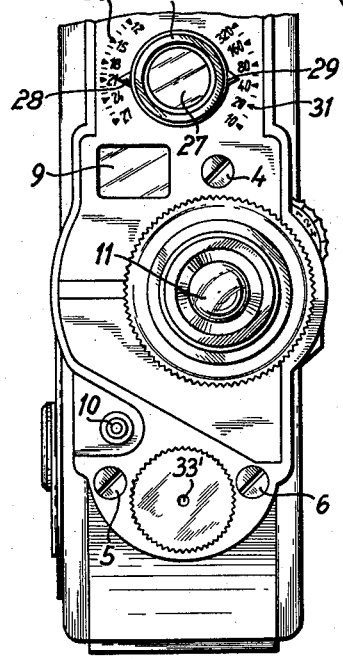
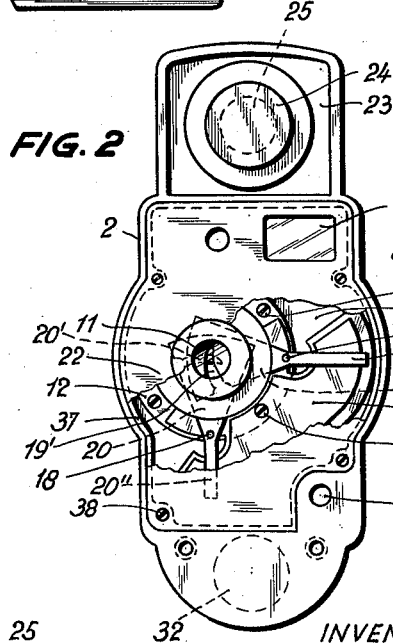
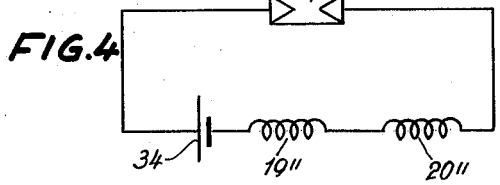
INVENTORS
Herbert Reinsch
Albert Schnell
BY Michael S. Striker
Attorney

United States Patent Office 3,103,152
Patented Sept. 10, 1963

3,103,152
CAMERA SUBASSEMBLY
Herbert Reinsch and Albert Schnell, Stuttgart, Germany, assignors to Eugen Bauer G.m.b.H., Stuttgart-Unterturkheim, Germany
Filed Oct. 8, 1959, Ser. No. 845,107
Claims priority, application Germany Oct. 9, 1958
6 Claims. (Cl. 95—64)

The present invention relates to cameras.

More particularly, the present invention relates to cameras which include devices for automatically regulating the exposure.

While cameras of this latter type are now becoming popular and are used to an increasing extent, they suffer from the defect of being of a relatively rigid, inflexible construction with respect to the capability of the camera to adapt itself to different combinations of features. The housings of such cameras are of a highly specialized construction which enables the housing to have the exposure control structure incorporated into the camera as an integral part thereof, and as a result it becomes impossible to improve or change part of the camera in any way and in addition the manufacture of the camera is relatively expensive because of the specialized structure required therefor.

One of the objects of the present invention is to overcome the above drawbacks by providing a camera with a subassembly which is manufactured independently of the rest of the camera and which includes the automatic exposure control structure so that the camera housing need not have a specialized construction in order to accommodate the exposure control structure.

A further object of the present invention is to provide a camera with a structure made up of a combination of independent units enabling any desired combination of these units to be assembled together by the retailer when the camera is purchased so that cameras at different price ranges can be provided in an extremely simple and inexpensive manner.

It is a further object of the present invention to provide a camera which, although it is made up of separate units joined together by the retailer, for example, nevertheless operates very efficiently and has its components very precisely manufactured and cooperating with each other properly.

With the above objects in view the present invention includes in a camera of the type referred to above a camera housing and a front subassembly removably connected with the camera housing at a front face of the latter. This subassembly has a rear face which engages the front face of the camera housing and the front face of the subassembly forms the front of the camera when the subassembly is joined thereto. This subassembly of the invention carries the objective of the camera as well as an automatic exposure control means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a side elevation of a camera which includes the structure of the invention, the front subassembly being shown in section in FIG. 1;

FIG. 2 is a fragmentary front elevation of the camera of FIG. 1, FIG. 2 showing the structure of FIG. 1 as seen from the left of FIG. 1;

FIG. 3 shows the front subassembly as seen from the rear with parts broken away to reveal interior structure; and FIG. 4 is a wiring diagram of the electrical structure.

The drawings illustrate the structure of the invention as forming part of a motion picture camera, and although the invention is particularly suited for use in motion picture cameras, it is also applicable to still cameras. As may be seen from FIG. 1, the camera illustrated therein includes a main camera unit 1 and a front assembly 2 joined to the main unit 1, this front subassembly 2 forming a unit entirely independent of the unit 1. The unit 1 includes a housing 3 having a front face located at the left end thereof, as viewed in FIG. 1, and this front face is perfectly flat and located in a plane normal to the optical axis, and the subassembly 2 includes a wall 14 which carries all of the components of the unit 2 and which is provided with a rear face engaging the front face of the housing 3. Screws 4–6 (FIG. 2) extend through openings of the wall 14 into threaded engagement with the housing 3 for removably fastening the unit 2 to the housing 3. At the side of the housing 3 which is visible in FIG. 1, the camera is provided with a door 7 and a lock 8. This door 7 can be turned to an open position after being unlocked by manipulation of the lock 8, and when the door 7 is open a reel of film can be introduced into the housing 3 or removed therefrom. The housing 3 includes in a known way a spring motor as well as structure for transporting the film in the necessary stepwise fashion past the exposure aperture, and also the housing 3 is provided with a viewfinder structure 9′ which cooperates with the window 9 (FIG. 2) carried by the wall 14 of the unit 2, so that part of the viewfinder assembly is carried by the unit 2. The wall 14 also carries a release plunger 10 which is pressed rearwardly in a known way by the operator in order to start the operation of the camera, the plunger 10 extending entirely through the wall 14 and cooperating with known structure 10′ carried by the housing 3.

Approximately midway between its upper and lower ends, the wall 14 of the unit 2 carries the objective 11 of the camera, and this objective 11 is provided with a flange 12 fixed to the wall 14, as shown in FIG. 1. The flange 12 carries screws 13 for fixing the objective to the wall 14. Furthermore, screws 15 serve to fix to the flange 12 a measuring instrument 16 which extends in part around the objective 11 and which includes a pair of shafts 17 and 18 supported for turning movement around their axes, respectively, and respectively carrying diaphragm blades 19 and 20 which cooperate with each other to control the aperture through which light passes along the optical axis through the objective. The diaphragm blades 19 and 20 are fixed to the shafts 17 and 18 so as to turn when these shafts turn, and the blades 19 and 20 are formed in a known way with mutually perpendicular slots 19′, 20′ of wedge-shaped configuration which may extend along arcs of a circle so that as the blades 19 and 20 turn one with respect to the other these wedge-shaped slots overlap each other to an increasing or decreasing extent so as to change the diaphragm setting of the camera.

As is apparent from FIG. 1 the objective as well as the instrument 16 and the diaphragm structure controlled thereby are located in a recess 21 formed in the wall 14 and accessible through the rear face of the wall 14. A closure plate 22 carried by the wall 14 closes the recess 21 thereof in a dust-tight, light-tight, and air-tight manner, the rearmost part of the objective extending through the closure plate 22 to provide the exposure aperture along which the film moves during exposure thereof.

The wall 14 is formed with a second recess 23 located over the recess 21 and also accessible through the rear face of the wall 14, and within the recess 23 is located the housing 24 of a photoelectric resistor which includes the light-sensitive element 25 of cadmium sulfide or the like. The wall 14 carries a window 27 (FIG. 2) through which light may reach the light-sensitive element 25, and the photoelectric resistor includes a manually operable diaphragm 24' which can be manually adjusted so as to regulate the cross section of the aperture through which light passes in order to reach the light-sensitive element 25. The diaphragm 24' is operatively connected in a known way with a ring 26 which surrounds the window 27 and which can be manually turned by the operator so as to adjust the diaphragm 24', and the ring 26 carries a pair of indices 28 and 29 extending therefrom and cooperating with scales 30 and 31 shown in FIG. 2 so as to control the setting of the diaphragm 24', these scales 30 and 31 indicating different films speeds according to a pair of different systems. When the subassembly 2 is connected to the camera housing 3 the front face of the latter closes the recess 23.

In the lower portion of the wall 14 beneath the recess 21 thereof there is located a third recess 32 and a plug 33 is threadedly carried by the wall 14 so as to removably close the recess 32. An electric battery 34 is located within the recess 32 and a spring 35 is compressed between the plug 33 and the battery 34 so as to maintain the latter in the illustrated position pressing against an electrical contact 36 arranged at the innermost surface of the recess 32. The plug 33 is provided with a central relatively small aperture 33' (FIG. 2) through which the interior of the recess 32 communicates with the outer atmosphere.

The above-described components are connected electrically through leads so as to provide the automatic setting of the diaphragm and thus control the exposure automatically. Thus, the operator will set the ring 26 at an angular position determined by the exposure index of the particular film which is used in the camera. This exposure index will be found on one or the other of the scales 30 and 31 depending upon the system used. The shafts 17 and 18 which are turnable in any suitable bearings are connected with coils 19", 20" which turn with these shafts, and these coils are in the form of loops which freely surround a permanent magnet 16' so that as the coils move along the permanent magnet they will turn the shafts 17 and 18 and thus set the diaphragm blades 19 and 20 at an angular position which will give the proper aperture size. The battery 34 is connected with these coils so as to supply current thereto, and the amount of current which pass through the coils is regulated in a known manner by the photoelectric resistor 25 so that it controls the position of the coils along the permanent magnet and thus controls the angular positions of the shafts 17 and 18 and the blades 19 and 20 therewith.

In FIG. 3 the flange 12 of the objective 11 is clearly visible, this flange being fixed to the wall 14 by the screws 13. The ring 11' is mounted on the objective housing after the objective is fixed to the wall 14, this ring 11' being placed over the objective housing from the exterior and held in position by an unillustrated means. The ring 11' serves to adjust the diaphragm in a manner which has nothing to do with the invention and is therefore not described.

As is apparent from FIG. 3, the plate 22 is held against a shoulder 37 by screws 38. The rear portion of the objective 11 extends with a close fit through an opening of the plate 22 so that the chamber 21 is tightly closed.

A bore 39 shown at the lower right of FIG. 3 serves to slidably guide the release plunger 10.

FIG. 4 illustrates how the battery 34, the cadmium sulfide resistor 25, and the coils 19" and 20" of the instrument 16 are connected in series. The current which flows in this circuit depends upon the size of the resistance 25, and the magnitude of this resistance is determined by the amount of light which reaches it.

The above-described front subassembly 2 of the invention includes the entire automatic exposure control structure and can be manufactured entirely independently of the unit 1 and moreover this unit 2 can be independently assembled, adjusted, and tested. The amount of light which pass through the objective 11 can be readily measured so that the operation of the diaphragm blades 19 and 20 can be checked, these blades 19 and 20 determining the amount of light which passes through the objective according to the amount of light which reaches the element 25 and controls the instrument 16 so as to control the angular positions of the diaphragm blades 19 and 20. The unit 2 which has been adjusted and set in this manner can now be very quickly connected to the front face of the housing 3 in the manner described above.

Of course, it is possible to provide different units 2 which can be connected with the same housing 3 of the same main unit 1. For example subassemblies 2 different from that described above can be provided with simpler controls or can have only a conventional objective without any automatic control. A front assembly 2 of this type can of course be connected in the same way with the main unit 1. The latter units are separately constructed in large numbers according to mass production methods, for example, and thus the structure of the invention can be very economically manufactured so that a camera with an automatic exposure control can be provided at quite a low cost. Furthermore, it is possible to provide front assemblies corresponding to the assembly 2 and having any desired type of control for any special purposes.

A retailer may stock a relatively large supply of the main units 1 and different types of front subassemblies which according to the desires of a purchaser may be joined with the unit 1 when the camera is purchased. Thus, the purchaser may purchase a camera which is fully automatic with respect to the exposure control or which is only semiautomatic or which is not automatic at all, and in this way it is possible to provide at relatively low cost cameras at different price levels to be stocked in a very simple way by the retailer.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera housing and a front subassembly forming a unit independent of said housing and adapted to be connected to the front thereof, said front subassembly including the objective of the camera and also an automatic exposure control means, both said objective and said automatic exposure control means being mounted on and carried solely by said front subassembly, said subassembly including a wall carrying the components of said subassembly and said wall having a front face which forms the front of the camera when said subassembly is connected to said housing and a rear face which engages a front face of the camera housing when the subassembly is joined thereto, said wall being formed with a recess accessible through said rear face thereof and said objective extending through said recess, said recess including part of said automatic exposure control means and a closure plate closing said recess in a light-tight and dust-tight manner adjacent said rear face of said front wall; and fastening means releasably fastening said front subassembly to said camera housing with said rear face of said wall engaging said front face of said camera housing and with said front face of said wall forming the front of the camera, and said fastening means being accessible at the exterior of the camera when said front subassembly is releasably fastened by said fastening means to said camera housing.

2. In a camera, in combination, a camera housing and a front subassembly forming a unit independent of said housing and adapted to be connected to the front thereof, said front subassembly including the objective and diaphragm of the camera and also an automatic exposure control means for automatically setting said diaphragm and including a battery and light-sensitive resistor connected in series, both said objective and said automatic exposure control means being mounted on and carried solely by said front subassembly, said subassembly including a wall carrying the components of the subassembly and having a front face which forms the front of the camera when said wall is connected to said housing thereof, said wall being formed with a recess accessible through said front face thereof and said battery being located in said recess and a plug removably closing said recess; and fastening means fastening said front subassembly to said camera housing in a position where said front face of said wall forms the front of the camera, said fastening means being accessible at the exterior of the camera when said front subassembly is in said position thereof.

3. A subassembly adapted to be connected to the front wall of a camera housing, said subassembly comprising, in combination, a supporting wall having front and rear faces and formed with a pair of recesses opening onto said rear face so that said recesses are accessible from said rear face of said wall; an objective carried by said wall and extending through one of said recesses thereof; diaphragm means extending into said objective and also located in said one recess; automatic control means located in part in said one recess and in part in the other of said recesses and cooperating with said diaphragm means for automatically adjusting the latter, the part of said automatic control means which is located in the other recess including a light-sensitive element, a window through which light reaches said element, and a manually operable diaphragm cooperating with said window for regulating the amount of light which reaches said light-sensitive element, said other recess being located over said one recess, and said wall being formed with a third recess opening onto the front face of said wall so as to be accessible through said front face, a battery located in said third recess, and a plug removably carried by said wall at said front face thereof and closing said third recess, both said objective and said automatic control means being carried solely by said supporting wall; and fastening means carried by said supporting wall for fastening the latter to the front wall of a camera housing, said fastening means being accessible at said front face of said supporting wall.

4. A subassembly adapted to be connected to the front wall of a camera housing, said subassembly comprising, in combination, a supporting wall having front and rear faces and formed with a pair of recesses opening onto said rear face so that said recesses are accessible from said rear face of said wall; an objective carried by said wall and extending through one of said recesses thereof; diaphragm means extending into said objective and also located in said one recess; automatic control means located in part in said one recess and in part in the other of said recesses and cooperating with said diaphragm means for automatically adjusting the latter, the part of said automatic control means which is located in the other recess including a light-sensitive element, a window through which light reaches said element, and a manually operable diaphragm cooperating with said window for regulating the amount of light which reaches said light-sensitive element, said other recess being located over said one recess, and said wall being formed with a third recess opening onto the front face of said wall so as to be accessible through said front face, a battery located in said third recess, and a plug removably carried by said wall at said front face thereof and closing said third recess, both said objective and said automatic control means being carried solely by said supporting wall, and a closure member closing said one recess in a dust-tight and light-tight manner and located adjacent the rear face of said wall; and fastening means carried by said supporting wall for fastening the latter to the front wall of a camera housing, said fastening means being accessible at said front face of said supporting wall.

5. A subassembly adapted to be connected to the front wall of a camera housing, said subassembly comprising, in combination, a supporting wall having front and rear faces and formed with a pair of recesses opening onto said rear face so that said recesses are accessible from said rear face of said wall; an objective carried by said wall and extending through one of said recesses thereof; diaphragm means extending into said objective and also located in said one recess; automatic control means located in part in said one recess and in part in the other of said recesses and cooperating with said diaphragm means for automatically adjusting the latter, the part of said automatic control means which is located in the other recess including a light-sensitive element, a window through which light reaches said element, and a manually operable diaphragm cooperating with said window for regulating the amount of light which reaches said light-sensitive element, said other recess being located over said one recess, and said wall being formed with a third recess opening onto the front face of said wall so as to be accessible through said front face, a battery located in said third recess, and a plug removably carried by said wall at said front face thereof and closing said third recess, both said objective and said automatic control means being carried solely by said supporting wall, said one recess being located between said other recess and said third recess and said third recess being located below said one recess while said other recess is located above said one recess; and fastening means carried by said supporting wall for fastening the latter to the front wall of a camera housing, said fastening means being accessible at said front face of said supporting wall.

6. A subassembly adapted to be connected to the front wall of a camera housing, said subassembly comprising, in combination, a supporting wall having front and rear faces and formed with a pair of recesses opening onto said rear face so that said recesses are accessible from said rear face of said wall; an objective carried by said wall and extending through one of said recesses thereof; diaphragm means extending into said objective and also located in said one recess; automatic control means located in part in said one recess and in part in the other of said recesses and cooperating with said diaphragm means for automatically adjusting the latter, the part of said automatic control means which is located in the other recess including a light-sensitive element, a window through which light reaches said element, and a manually operable diaphragm cooperating with said window for regulating the amount of light which reaches said light-sensitive element, said other recess being located over said one recess, and said wall being formed with a third recess opening onto the front face of said wall so as to be accessible through said front face, a battery located in said third recess, and a plug removably carried by said wall at said front face thereof and closing said third recess, both said objective and said automatic control means being carried solely by said supporting wall, and said wall also carrying a shutter release plunger which extends through said wall so as to cooperate with the camera structure to which the subassembly is connected and said wall also carrying a viewfinder window; and fastening means carried by said supporting wall for fastening the latter to the front wall of a camera housing, said fastening means being accessible at said front face of said supporting wall.

References Cited in the file of this patent

UNITED STATES PATENTS

| | | |
|---|---|---|
| 2,051,061 | Tonnies | Aug. 18, 1936 |
| 2,059,032 | Riszdorfer | Oct. 27, 1936 |
| 2,132,306 | Linke | Oct. 4, 1938 |
| 2,194,031 | Riszdorfer | Mar. 19, 1940 |
| 2,655,086 | Walker | Oct. 13, 1953 |
| 2,841,064 | Bagby et al. | July 1, 1958 |

FOREIGN PATENTS

| | | |
|---|---|---|
| 787,720 | Great Britain | Dec. 11, 1957 |